(12) United States Patent
Waltermann et al.

(10) Patent No.: US 10,959,052 B2
(45) Date of Patent: Mar. 23, 2021

(54) LOCAL MEMORY DIRECTION CACHING

(71) Applicant: Lenovo (Singapore) Pte. Ltd., Singapore (SG)

(72) Inventors: Rod D Waltermann, Rougemont, NC (US); Nathan J. Peterson, Durham, NC (US); Arnold S. Weksler, Raleigh, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2 days.

(21) Appl. No.: 15/377,721

(22) Filed: Dec. 13, 2016

(65) Prior Publication Data

US 2018/0167780 A1   Jun. 14, 2018

(51) Int. Cl.
| | |
|---|---|
| *H04W 4/02* | (2018.01) |
| *G01C 21/34* | (2006.01) |
| *G01C 21/36* | (2006.01) |
| *H04W 4/60* | (2018.01) |
| *H04W 4/024* | (2018.01) |

(52) U.S. Cl.
CPC .......... *H04W 4/025* (2013.01); *G01C 21/343* (2013.01); *G01C 21/362* (2013.01); *H04W 4/024* (2018.02); *H04W 4/60* (2018.02)

(58) Field of Classification Search
None
See application file for complete search history.

(56) References Cited

U.S. PATENT DOCUMENTS

| | | | |
|---|---|---|---|
| 6,208,934 B1* | 3/2001 | Bechtolsheim .... | G01C 21/3688 701/428 |
| 9,568,331 B1* | 2/2017 | Narang .............. | G01C 21/3617 |
| 2002/0169778 A1* | 11/2002 | Natesan ................ | G01C 21/32 |
| 2010/0030466 A1* | 2/2010 | Rogers ..................... | G08G 1/20 701/533 |
| 2013/0065613 A1* | 3/2013 | Stopel ................. | G06F 16/9537 455/456.3 |
| 2014/0095943 A1* | 4/2014 | Kohlenberg .......... | G06F 11/004 714/47.3 |
| 2018/0135989 A1* | 5/2018 | Schreier .................. | H04W 4/44 |

* cited by examiner

*Primary Examiner* — Jonathan M Dager
*Assistant Examiner* — Garrett F Evans
(74) *Attorney, Agent, or Firm* — Schwegman Lundberg & Woessner, P.A.

(57) ABSTRACT

A computer implemented method including receiving an original starting location and an original destination location at a processor of a mobile wireless device, determining a route, including directions, based on the starting location and destination, retrieving data for the mobile wireless device indicative of wireless communication coverage corresponding to the route, determining first additional directions to a first additional location from the original destination location, and caching the first additional directions in local memory of the mobile wireless device accessible by the processor to facilitate communication of the additional directions from the local memory to a user.

20 Claims, 4 Drawing Sheets

LOCAL MEMORY DIRECTION CACHING

BACKGROUND

Mobile devices are commonly used to provide directions to guide a user along a route to a destination location. The mobile devices commonly use wireless communications to request routes from various servers. An app may be included on the mobile device, and a selected route is downloaded to the mobile device. The mobile device is used to provide a display of the route and verbal instructions.

SUMMARY

A computer implemented method includes receiving an original starting location and an original destination location at a processor of a mobile wireless device, determining a route, including directions, based on the starting location and destination, retrieving data for the mobile wireless device indicative of wireless communication coverage corresponding to the route, determining first additional directions to a first additional location from the original destination location, and caching the first additional directions in local memory of the mobile wireless device accessible by the processor to facilitate communication of the additional directions from the local memory to a user.

A mobile wireless device includes a processor, a display, and a local memory device coupled to the processor having instructions stored thereon. The instructions are executable by the processor to receive an original starting location and an original destination location, determine a route, including directions, based on the starting location and destination, retrieve data for the mobile wireless device indicative of wireless communication coverage corresponding to the route, determine first additional directions to a first additional location from the original destination location, and cache the first additional directions in the local memory device to facilitate communication of the additional directions from the local memory device to a user.

A machine readable storage device that is not a transitory signal, has instructions that are executable by a processor of a mobile wireless device to perform operations including receiving an original starting location and an original destination location, determining a route, including directions, based on the starting location and destination, retrieving data for the mobile wireless device indicative of wireless communication coverage corresponding to the route, determining first additional directions to a first additional location from the original destination location, and caching the first additional directions in local memory of the mobile wireless device accessible by the processor to facilitate communication of the additional directions from the local memory to a user.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

Directions to a destination are cached in a mobile device responsive to the destination being outside areas providing reliable mobile device communications. In some embodiments, return directions are cached prior to the mobile device losing reliable communications. The return directions may include a best return path and alternatively regions around the destination that may be of interest to a user of the mobile device. The return directions may also be selected based on temporal information. For instance, if a destination is to be navigated to from a known work location towards the end of normal working hours, return directions may be based on where a user is likely to go next, such as home, or a local or historically frequently visited business for food or drink and expected time of leaving the destination.

In some embodiments, crowd sourced data may be used to identify areas without reliable mobile device communications. The crowd sourced data may be received from others navigating routes corresponding to the directions to the destination, such as the same routes or routes close to the same routes and destination. Further data regarding signal strength near the destination and corresponding routes may also be used to determine areas of unreliable coverage, such as a weak signal, no coverage, or even an area where significant roaming charges may be incurred. Still further, carrier data regarding coverage may also be used to determine when navigation to a destination may encounter areas of unreliable mobile communications. While a user may be able to navigate to the destination based on the route, a lack of network communications may prevent a user from receiving further navigation instructions via the network, or incur the cost of roaming charges.

Information regarding areas of unreliable mobile communications may be used to determine the amount of data corresponding to the directions, such as maps, route instructions or directions, and regions of potential interest and further route directions to such regions to cache. If mobile communication coverage is good, minimal amounts of information may be cached. If mobile communication coverage at the destination and along some routes to the destination are unreliable, more information may be cached to insure the user is provided adequate directions to and to return from the destination. The amount of information cached may also be a function of available resources on the mobile device in further embodiments. The user may specify the amount of information to cache in further embodiments. Trip data, such as calendar information indicating how long a user may be at the destination, or return flights, or other information may be used to help determine how long information should be persisted on the cache.

Figure 1:
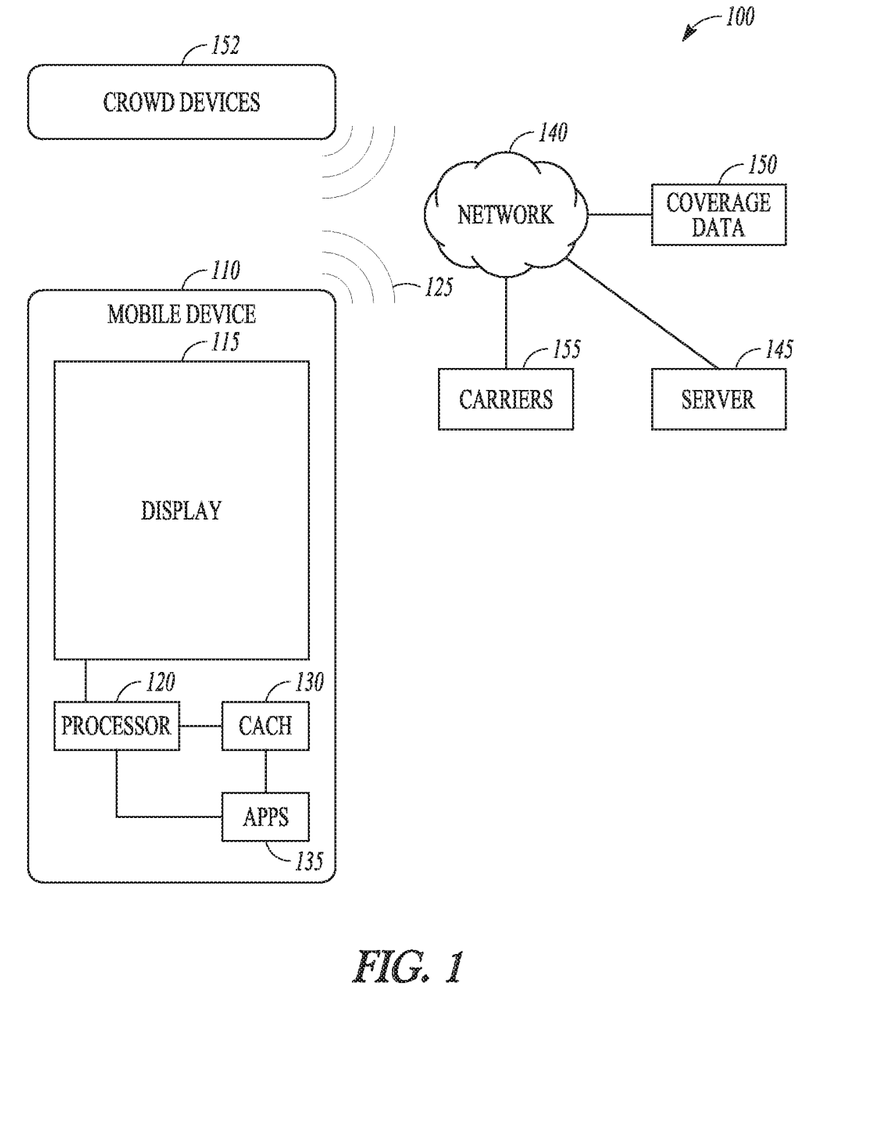
FIG. 1 is block diagram of a mobile communication network including a mobile device and server according to an example embodiment.

FIG. 1 is a block diagram of a mobile communication network 100 that includes a mobile device 110, such as a cell phone, tablet, or other device that may be used by a user to provide navigation directions to a destination via voice, display 115, or both. The device 110 may have a processor 120 and other circuitry for wireless communications 125 and global positioning or other location sensing capabilities. In various embodiments, the device 110 may be used for navigation using commonly available mapping applications, such as Google Maps, Waze, or other applications. Many such applications provide directions in the form of audible directions and graphical information showing one or more routes to take to the destination.

In one embodiments, mobile device 110 has a local cache 130 which may be used to store directions to a destination. The directions may include navigation information, including instruction for display or audible delivery, and maps that include route information to be displayed to a user navigating to the destination. The cache 130 may be part of normal mobile device memory rather than a faster memory in some embodiments, but is represented as a separate area of memory that may be limited in size. Such size limits may be referred to as a resource constraint, as resource constraints limit how much direction data can be stored in the cache 130. Apps or applications may also be stored in memory of the mobile device as indicated at 135.

In one embodiment, the mobile device communicates wirelessly, such as via a cellular communication protocol to a mobile network 140, which may be further coupled to a server 145. The server 145 may provide directions based on requests from the mobile device that indicate a current location and a destination. In some embodiments. The server may also provide further directions for caching in the mobile device, such as return directions or directions to likely points of interest to the user of the mobile device based on known user interests or temporal information, such as schedules.

The amount of such further directions may be selected by the server 145 or by the mobile device 110, or a combination of both in various embodiments based on the resources available on the mobile device, known mobile communication coverage along a route to the destination and at the destination, schedule information, known user preferences, known user schedule, amount of data associated with such further directions, and other information.

In one embodiment, mobile communication coverage may be provided by the server 145, or may otherwise be obtained by coverage data 150 available via network 140. Coverage data 150 may be crowd sourced in one embodiment. Users of mobile devices 152, or the devices themselves may provide information via the network about weak signals or no coverage areas along the route and at the destination. Such information may be compiled to build polygonal shapes representative of adequate and inadequate mobile communication coverage along the route and at the destination. The larger the area of lack of coverage, the higher the need for storage of additional direction from the destination. If there is adequate coverage along the entire route and at the destination, the need for caching additional directions is minimal. No additional directions need be cached, but in some embodiments, with inconsistent or intermittent coverage, or even a chance of an unlikely coverage outage, or possible roaming charges, additional directions may still be cached as a sort of coverage insurance policy if sufficient resources are available. Additional coverage information may be provided by one or more carriers 155. The additional coverage information may be useful where a mobile device is limited to a specific carrier which may have different coverage than other carriers for different types of mobile devices.

Figure 2:
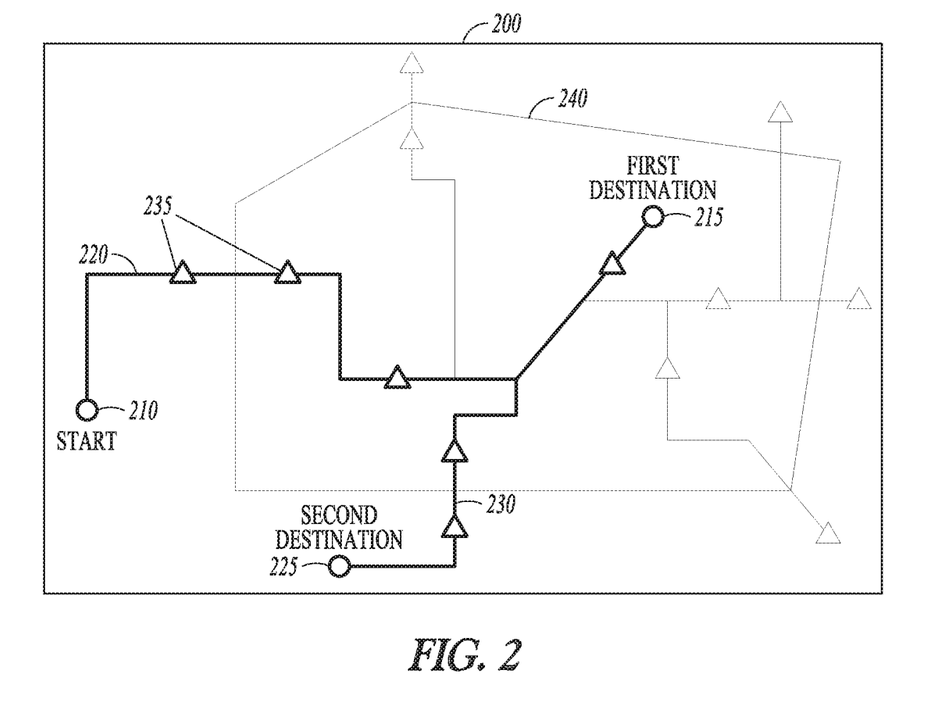
FIG. 2 is a graphical representation of a map illustrating graphical representations of routes according to an example embodiment.

FIG. 2 is a graphical representation of a map 200 illustrating graphical representations of routes. Example routes include a starting point 210, a first destination 215, a first route 220 between the starting point 210 and first destination 215, a second destination 225, and a second route 230 between the first destination 215 and the second destination 225. The routes 220 and 230 are shown as thicker lines to distinguish them from other routes that are visible on map 200. For purposes of illustration, the routes are roads for a vehicle, such as an automobile, but in further embodiments, the routes may be walking paths, bike paths, or other type of paths.

Squares, including two squares identified with reference number 235 in map 200 illustrate locations of crowd sourced mobile communication coverage data. A polygon 240 represents an area of poor or inadequate mobile communication coverage. The squares 235 are seen as both outside and inside the polygon 240. The squares outside the polygon 240 correspond to reports by users, or the devices themselves that the coverage where they are is adequate. The squares inside the polygon 240 are representative of reports by users or devices themselves, that the coverage at the corresponding locations of the squares was bad or that there was no coverage. The polygon 240 may be drawn between selected squares and extrapolated where insufficient triangles are available. For simplicity of illustration only, just a few squares are shown. In some embodiments, hundreds or more squares corresponding to reports may be used to fairly accurately define the polygon 240.

Note that since the coverage at the areas inside the polygon were bad, the reports may be queued by the devices and then forwarded on when mobile communications were better outside the polygon 240. The reports may comprise a numerical indicator of reception strength or lack of any coverage at a particular point (GPS coordinate) at all in some embodiments, or even a user selected rating of coverage, such as excellent, average, poor, and no coverage. Coverage data element 150 may use such reports to generate the polygon of poor coverage 240. When a route is determined, it may be recognized that a portion of the route is through the polygon, resulting in the directions being provided for caching on the mobile device. In this case, the first destination 215 is within the polygon 240, as well as good portions of the route to the first destination 215 and to the second destination 225, making the directions a very good candidate for caching.

Note that the polygon 240 may be represented in various forms, and need not precisely correspond to exact areas of poor or no coverage. In one embodiment, the polygon may be represented by a series of coordinates with lines connecting the coordinates. In further embodiments, the polygon 240 may comprise a single triangle represented by three sets of coordinates, or multiple sets of such triangles which may or may not share edges, similar to triangular representations of a surface or area used in graphics processors.

The polygon 240 may be used in some embodiments as a general indication of coverage gaps sufficient to determine whether or not to cache additional route data and how much such data to cache. For instance, if the original destination is within an area where several reports or other indications of poor or no coverage exist, addition route data will be cached. In a further example, if a percentage of the route is through areas with poor or no coverage, additional route data will be cached. The percentage may vary in some embodiments from zero percent to 100 percent, including all values therebetween. In further embodiments, additional route data may be cached regardless of expected wireless communication coverage.

Figure 3:
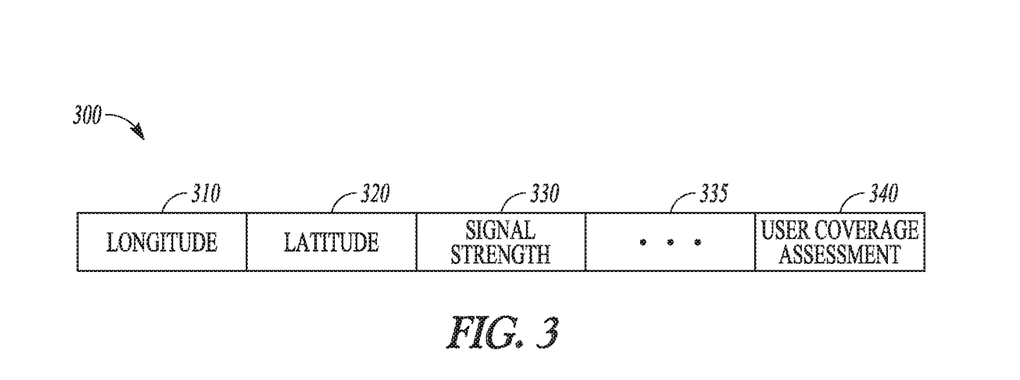
FIG. 3 is an example data structure for a coverage report according to an example embodiment.

FIG. 3 is an example data structure for a report indicated generally at 300. In one embodiment, a number of fields may provide information in any order, including the order illustrated. At 310 and 320, a latitude and longitude coordinates corresponding to the report may be provided. At 330, user equipment, such as a mobile wireless device, may provide an indication of signal strength at the location specified by the coordinates. The signal strength may be digital representation of multiple bits or a single bit in various embodiments. If a single bit, a zero may correspond to poor or no signal strength, while a one may correspond to adequate to excellent signal strength. Other data may be provided at 335, such as a carrier identifier, user identifier, time of day, or further information. At 340, a user coverage assessment may be provided, such as an assessment selected from various options including no coverage, poor coverage, average or adequate coverage, good coverage, or excellent coverage. These assessments may be coded as a digital number in field 340.

Figure 4:
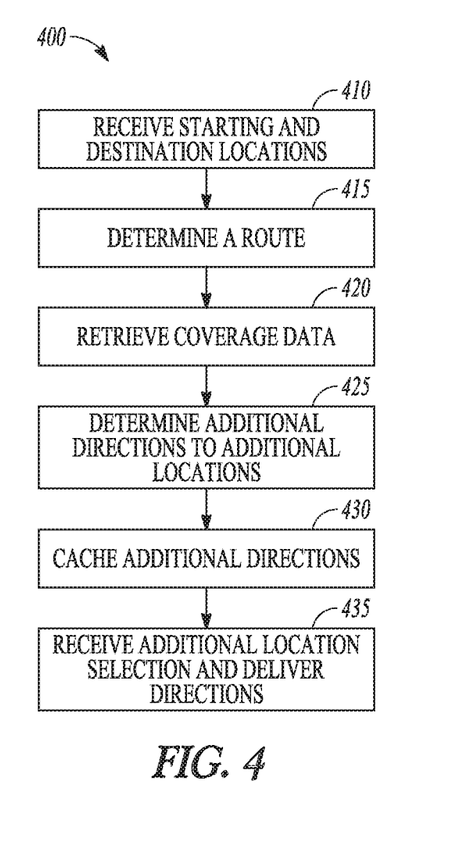
FIG. 4 is a flowchart representing a computer implemented method of selectively caching navigation directions as a function of expected wireless communication coverage along a route according to an example embodiment.

FIG. 4 is a flowchart representing a computer implemented method 400 of selectively caching navigation directions as a function of expected wireless communication coverage along a route. Method 400 may be implemented using a processor executing an app or application stored on a wireless mobile device local memory in one embodiment. The app may interact with one or more networked servers to obtain mapping information and wireless network coverage information.

Method 400 begins at 410 by receiving an original starting location and an original destination location at a processor of a mobile wireless device. The original starting location may be entered by a user of the device or obtained via GPS or cell triangulation in various embodiments. The destination location may also be entered by the user. In some embodiments, locations may be selected via interaction with a calendared event with a location specified, via a search using a search engine, or even manually entered via voice, touchscreen interaction, or keyboard interaction.

A mapping service may be used to determine a route at 415, including directions, based on the starting location and destination. Many such mapping services are currently available such as Google Maps, Waze, and others. In further embodiments, the mobile device may receive map data and determine routes using the locations and map data. The directions may include a displayable map and verbal directions for display or audible delivery to the user such as by a speaker or earpiece.

At 420, coverage data may be retrieved for the mobile wireless device indicative of wireless communication coverage corresponding to the route. The coverage data may be retrieved from local storage or one or more servers in various embodiments. The coverage data may be processed with the route to determine that at least a portion the route may pass through poor or no wireless communication coverage for the mobile device. At 425, first additional directions to a first additional location from the original destination location may be determined. Examples of additional locations may include the home of the user where the original location was a place of work of the user and a likely time of leaving the original destination is after working hours. Similarly, a likely time of leaving the original destination may be representative of the user going to a restaurant, or a location specified for a next event on a calendar of the user on the mobile wireless device. Directions to multiple additional locations may be cached if sufficient resources are available on the mobile device.

At 430, the first additional directions are cached in local memory of the mobile wireless device accessible by the processor to facilitate communication of the additional directions from the local memory to a user. Such addition directions may be communicated to the user in areas where there is no wireless communication coverage. Where multiple additional directions are cached, a user may be provided with an option of which directions to follow. At 435, the additional directions may be delivered to the user when leaving the original destination. In various embodiments, the user may be provided the ability to select an additional direction from a list or display of multiple locations. The selection may be done by voice, tapping a touchscreen, or using keys on the mobile device.

In one embodiment, the first additional directions may include return directions from the original destination location to the original starting location. The first additional directions may alternative include directions from the original destination location to the first additional location that is different than the original starting location.

In a further embodiment, the first additional location may be automatically selected by the processor as a function of a calendar of the user accessible by the processor. The first additional location may also be selected as a function of locations proximate the original destination corresponding to user preferences accessible by the processor. The first additional directions may be stored on the cache a length of time determined from the calendar of the user accessible by the processor and as a function of the amount of cache available. In some embodiments, the user may be provided a list of additional locations and directions to choose from for caching if cache space is limited.

In some embodiments, the first additional directions include directions to multiple further locations. The first additional directions to multiple further locations may be limited by an amount of cache available. The limiting may be performed by obtaining an indication of the amount of cache available, and adding additional directions to the cache until no further cache is available. The additional directions may be added to cache based on a ranking of the most likely additional locations.

The data indicative of wireless communication coverage corresponding to the route may include crowd sourced reports of wireless network coverage, data provided by at least one wireless carrier, or a combination of both.

The directions and additional directions may include a map for display on a display of the mobile wireless device and directions capable of being audibly provided to the user of the mobile wireless device.

Figure 5:
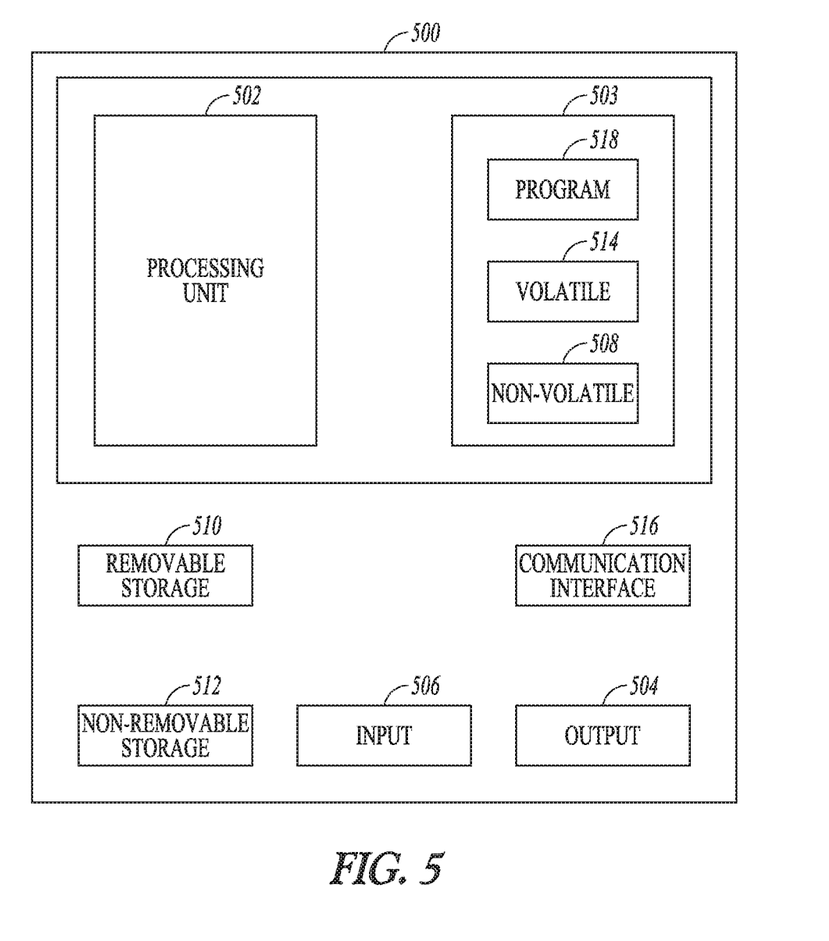
FIG. 5 is a block schematic diagram of a circuitry to implement the mobile wireless device according to an example embodiment.

FIG. 5 is a block schematic diagram of circuitry, such as a computer system 500 to implement the mobile wireless device, servers, storage devices, and other components useful for performing the method described. All components need not be used in various embodiments. One example computing device in the form of a computer 500, may include a processing unit 502, memory 503, removable storage 510, and non-removable storage 512. Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 500 may include or have access to a computing environment that includes input 506, output 504, and a communication connection 516. Output 504 may include a display device, such as a touchscreen, that also may serve as an input device. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 502 of the computer 500. A hard drive, CD-ROM, DRAM, and RAM are some examples of data storage devices including a non-transitory computer-readable medium. For example, a computer program 518 may be used to cause processing unit 502 to perform one or more methods or algorithms described herein. Computer program 518 may be stored on a device or may be downloaded from a server to a device over a network such as the Internet. Computer-readable instructions may also be included on a computer readable storage medium that is being vended and/or provided, where the computer readable storage medium is defined as not encompassing a transitory signal, carrier wave, and/or a signal per se.

Examples

In example 1, a computer implemented method includes receiving an original starting location and an original destination location at a processor of a mobile wireless device, determining a route, including directions, based on the starting location and destination, retrieving data for the mobile wireless device indicative of wireless communication coverage corresponding to the route, determining first additional directions to a first additional location from the original destination location, and caching the first additional directions in local memory of the mobile wireless device accessible by the processor to facilitate communication of the additional directions from the local memory to a user.

Example 2 includes the computer implemented method of example 1 wherein the first additional directions comprise return directions from the original destination location to the original starting location.

Example 3 includes the computer implemented method of any of examples 1-2 wherein the first additional directions comprise directions from the original destination location to the first additional location that is different than the original starting location.

Example 4 includes the computer implemented method of example 3 wherein the first additional location is selected as a function of a calendar of the user accessible by the processor.

Example 5 includes the computer implemented method of any of examples 3-4 wherein the first additional location is selected as a function of locations proximate the original destination corresponding to user preferences accessible by the processor.

Example 6 includes the computer implemented method of any of examples 1-5 wherein the first additional directions are stored on the cache a length of time determined from a calendar of the user accessible by the processor.

Example 7 includes the computer implemented method of any of examples 1-6 wherein the first additional directions include directions to multiple further locations.

Example 8 includes the computer implemented method of example 7 wherein the first additional directions to multiple further locations is limited by an amount of cache available.

Example 9 includes the computer implemented method of any of examples 1-8 wherein the data indicative of wireless communication coverage corresponding to the route comprises crowd sourced reports of wireless network coverage.

Example 10 includes the computer implemented method of any of examples 1-9 wherein the data indicative of wireless communication coverage corresponding to the route comprises data provided by at least one wireless carrier.

Example 11 includes the computer implemented method of any of examples 1-10 wherein the directions and additional directions include a map for display on a display of the mobile wireless device and directions capable of being audibly provided to the user of the mobile wireless device.

In example 12, a mobile wireless device includes a processor, a display, and a local memory device coupled to the processor having instructions stored thereon. The instructions are executable by the processor to receive an original starting location and an original destination location, determine a route, including directions, based on the starting location and destination, retrieve data for the mobile wireless device indicative of wireless communication coverage corresponding to the route, determine first additional directions to a first additional location from the original destination location, and cache the first additional directions in the local memory device to facilitate communication of the additional directions from the local memory device to a user.

Example 13 includes the mobile wireless device of example 12 wherein the first additional directions comprise return directions from the original destination location to the original starting location.

Example 14 includes the mobile wireless device of any of examples 12-13 wherein the first additional directions comprise directions from the original destination location to the first additional location that is different than the original starting location.

Example 15 includes the mobile wireless device of example 14 wherein the first additional location is selected as a function of a calendar of the user accessible by the processor.

Example 16 includes the mobile wireless device of any of examples 14-15 wherein the first additional location is selected as a function of locations proximate the original destination corresponding to user preferences accessible by the processor.

Example 17 includes the mobile wireless device of any of examples 12-16 wherein the first additional directions are stored on the cache a length of time determined from a calendar of the user accessible by the processor.

In example 18, a machine readable storage device that is not a transitory signal, has instructions that are executable by a processor of a mobile wireless device to perform operations including receiving an original starting location and an original destination location, determining a route, including directions, based on the starting location and destination, retrieving data for the mobile wireless device indicative of wireless communication coverage corresponding to the route, determining first additional directions to a first additional location from the original destination location, and caching the first additional directions in local memory of the mobile wireless device accessible by the processor to facilitate communication of the additional directions from the local memory to a user.

Example 19 includes the machine readable storage device of example 18 wherein the first additional location is selected as a function of a calendar of the user accessible by the processor.

Example 20 includes the machine readable storage device of any of examples 18-19 wherein the first additional location is selected as a function of locations proximate the original destination corresponding to user preferences accessible by the processor.

Example 21 includes the machine readable storage device of any of examples 18-20 wherein the data indicative of wireless communication coverage corresponding to the route comprises crowd sourced reports of wireless network coverage.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A computer implemented method comprising:
receiving an original starting location and an original end destination location at a processor of a mobile wireless device;
determining a route, including navigation instructions, based on the starting location and end destination;
retrieving data for the mobile wireless device indicative of wireless communication coverage corresponding to the route;
determining first additional navigation instructions to a first additional location from the original end destination location wherein the first additional location is selected by the computer as a function of identified locations proximate to the original end destination corresponding to user preferences; and
caching the first additional navigation instructions in local memory of the mobile wireless device accessible by the processor to facilitate communication of the additional navigation instructions from the local memory to a user.

2. The computer implemented method of claim 1 wherein the first additional navigation instructions comprise return directions from the original end destination location to the original starting location.

3. The computer implemented method of claim 1 wherein the first additional navigation instructions comprise directions from the original end destination location to multiple alternative additional locations.

4. The computer implemented method of claim 3 wherein the first additional location is selected as a function of a calendar of the user accessible by the processor, wherein the additional location is selected based on the original end destination being scheduled after working hours.

5. The computer implemented method of claim 3 wherein the first additional location is selected as a function of locations proximate the original end destination corresponding to user destination preferences accessible by the processor.

6. The computer implemented method of claim 1 wherein the first additional navigation instructions are stored on the cache a length of time determined from a calendar of the user accessible by the processor.

7. The computer implemented method of claim 1 wherein the first additional navigation instructions include directions to multiple optional further locations.

8. The computer implemented method of claim 7 wherein the first additional navigation instructions to multiple further locations is limited by an amount of cache available, and wherein the multiple further locations are provided to a user for selection for caching.

9. The computer implemented method of claim 1 wherein the data indicative of wireless communication coverage corresponding to the route comprises crowd sourced reports of wireless network coverage.

10. The computer implemented method of claim 1 wherein the data indicative of wireless communication coverage corresponding to the route comprises data provided by at least one wireless carrier.

11. A mobile wireless device comprising:
a processor;
a display;
a local memory device coupled to the processor having instructions stored thereon executable by the processor to:
receive an original starting location and an original end destination location;
determine a route, including navigation instructions, based on the starting location and end destination;
retrieve data for the mobile wireless device indicative of wireless communication coverage corresponding to the route;
determine first additional navigation instructions to a first additional location from the original end destination location wherein the first additional location is selected by the processor as a function of identified locations proximate to the original end destination corresponding to user preferences; and
cache the first additional navigation instructions in the local memory device to facilitate communication of the additional directions from the local memory device to a user.

12. The mobile wireless device of claim 11 wherein the first additional navigation instructions comprise return directions from the original end destination location to the original starting location.

13. The mobile wireless device of claim 11 wherein the first additional navigation instructions comprise directions from the original end destination location to the first additional location that is different than the original starting location.

14. The mobile wireless device of claim 13 wherein the first additional location is selected as a function of a calendar of the user accessible by the processor.

15. The mobile wireless device of claim 13 wherein the first additional location is selected as a function of locations proximate the original end destination corresponding to user destination preferences accessible by the processor.

16. The mobile wireless device of claim 11 wherein the first additional navigation instructions are stored on the cache a length of time determined from a calendar of the user accessible by the processor.

17. A machine readable storage device that is not a transitory signal, having instructions that are executable by a processor of a mobile wireless device to perform operations comprising:
   receiving an original starting location and an original end destination location;
   determining a route, including navigation instructions, based on the starting location and end destination;
   retrieving data for the mobile wireless device indicative of wireless communication coverage corresponding to the route;
   determining first additional navigation instructions to a first additional location from the original end destination location wherein the first additional location is selected by the processor as a function of identified locations proximate to the original end destination corresponding to user preferences; and
   caching the first additional directions in local memory of the mobile wireless device accessible by the processor to facilitate communication of the additional navigation instructions from the local memory to a user.

18. The machine readable storage device of claim 17 wherein the first additional location is selected as a function of a calendar of the user accessible by the processor.

19. The machine readable storage device of claim 17 wherein the first additional location is selected as a function of locations proximate the original end destination corresponding to user destination preferences accessible by the processor.

20. The machine readable storage device of claim 17 wherein the data indicative of wireless communication coverage corresponding to the route comprises crowd sourced reports of wireless network coverage.

* * * * *